United States Patent
Flachsmann

(10) Patent No.: US 7,538,243 B2
(45) Date of Patent: May 26, 2009

(54) INDANES AND INDANONES AND THEIR USE IN PERFUMERY

(75) Inventor: Felix Flachsmann, Zurich (CH)

(73) Assignee: Givaudan SA, Vernler (CH)

( * ) Notice: Subject to any disclaimer, the term of this patent is extended or adjusted under 35 U.S.C. 154(b) by 221 days.

(21) Appl. No.: 10/504,408

(22) PCT Filed: Jan. 28, 2003

(86) PCT No.: PCT/CH03/00065

§ 371 (c)(1), (2), (4) Date: Feb. 16, 2005

(87) PCT Pub. No.: WO03/072533

PCT Pub. Date: Sep. 4, 2003

(65) Prior Publication Data

US 2005/0148493 A1    Jul. 7, 2005

(30) Foreign Application Priority Data

Feb. 28, 2002 (EP) .................................. 02004585

(51) Int. Cl.
C07C 69/02 (2006.01)
C07C 13/465 (2006.01)

(52) U.S. Cl. ......................................... 560/231; 585/27

(58) Field of Classification Search ................. 560/116, 560/118, 121, 122; 568/308, 325, 327, 329, 568/330, 368, 379
See application file for complete search history.

(56) References Cited

U.S. PATENT DOCUMENTS

| | | | | |
|---|---|---|---|---|
| 3,078,319 | A | * | 2/1963 | Wood ..................... 585/410 |
| 3,944,679 | A |   | 3/1976 | Takahara et al. ........... 426/538 |
| 4,532,357 | A | * | 7/1985 | van Loveren et al. ....... 568/327 |
| 5,329,049 | A |   | 7/1994 | Weisse et al. .............. 568/319 |

FOREIGN PATENT DOCUMENTS

| EP | 0 162 465 A | 11/1985 |
|---|---|---|
| EP | 1 184 447 A1 | 3/2002 |
| FR | 1377388 | * 9/1964 |
| FR | 1 377 388 A | 11/1964 |
| GB | 796130 | * 6/1958 |

OTHER PUBLICATIONS

Urry et al. Journal of Organic Chemistry vol. 29, No. 7, pp. 1663-1669.*
Das et al., Tetrahedron Letters, vol. 37, Issue 25, Jun. 17, 1996, pp. 4421-4422.*
Ghosal et al., Tetrahedron Letters (1995), 36(14), 2527-8.*
Bruson and Plant in J. Org. Chem. 1967, p. 3356, "Cyclizations by Carbon Monoxide in Friedel-Crafts Reactions . . .".
Ulrich, Hansen and Schmid, in Helvetica Chimica Acta, 1970, vol. 53, p. 1323, "Photoisomerisierung von o-Di-isobutenylbenzol".
Buu-Hoi and Royer in Memoires Presentes a la Societe Chimique, p. 813.
Database Crossfire Beilstein 'Online!; Beilstein Institut zur Forderung der Chemischen Wissenschaften, Frankfurt am Main, DE; Database accession No. brn 1856628; XP002233628; abstract & JACS; vol. 96, No. 6, 1974, pp. 1979-1980.
Database Crossfire Beilstein 'Online!; Beilstein Institut zur Forderung der Chemischen Wissenschaften, Frankfurt am Main, DE; Database accession No. brn 3100385; XP002233629; abstract & J Chem Soc. C; 1967, pp. 682-685.
Database Crossfire Beilstein 'Online!; Beilstein Institut zur Forderung der Chemischen Wissenschaften, Frankfurt am Main, DE; Database accession No. brn 2617509; XP002233630; abstract & J Chem Soc. C; 1967, pp. 682-685.

* cited by examiner

*Primary Examiner*—Karl J Puttlitz
(74) *Attorney, Agent, or Firm*—Norris McLaughlin & Marcus, PA

(57) ABSTRACT

Use of compounds of the formula (1) as flavour or fragrance ingredients

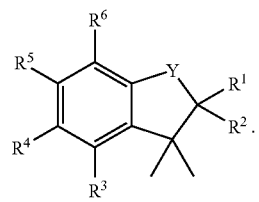

5 Claims, No Drawings

INDANES AND INDANONES AND THEIR USE IN PERFUMERY

This application is a 371 of PCT/CH03/00065, filed Jan. 28, 2003, which claims foreign priority benefit under 35 U.S.C. § 119 of the European Patent Application No. 02004585.2 filed Feb. 28, 2002.

The present invention relates to derivatives of 3,3-dimethyl indanone and 1,1-dimethyl indane, and to compositions containing same that are useful in flavour and fragrance applications.

Safranal (2,2,6-trimethyl-4,6-cyclohexadiene-1-carbaldehyde) is an important ingredient in the spice saffron, and imparts a characteristic spicy, warm odour to this spice. Safranal is also an important and extremely valuable ingredient in perfumery applications. Yet despite these valuable characteristics there are restrictions on its use in perfume applications such that levels of 0.005% should not be exceeded. This restriction is based on the observation of sensitisation reactions when tested at 0.1% in a human repeated insult patch test. Accordingly, there is a need for alternatives for safranal.

Substituted indanones and indanes have been described in the published literature. Some have been described as having use as fragrance ingredients although none have been described as having safranal like qualities.

Thus, EP 162,465 describes the use of 3,3-dimethyl indanones in perfumery. The 2-position of said indanones is unsubstituted.

In U.S. Pat. No. 3,944,679 there are disclosed 2-, and 3-alkyl substituted indanones having courmarin-like aroma. However, 3,3,-disubstituted indanones are not disclosed.

Ulrich et al in Helvetica Chim. Acta 1970, 53, 1323 discloses 2-isopropyl-3,3-dimethyl indan-1-one but no odour characteristics are described.

Bruson et al in J. Org. Chem. 1967, 3356 describes the use of 2,2,3,3-tetramethyl indanone but no characterisation or odour characteristics are disclosed.

Buu-Hoi et al in Mémoires Présentés A La Société Chimique at page 813 discloses 3,3,5,7-tetramethyl indane-1-one, 3,3,5-trimethyl indane-1-one, and 3,3-dinethyl-5 isopropyl or tert.butyl indane-1-one. No odour characteristics are disclosed for any of these compounds.

FR 1, 377,388 discloses certain 1,1-dimethyl-dialkyl indanes and 1,1,2-trimethyl-dialkyl indanes as intermediates in the syntheses of musk molecules. However, no odour description is given for the indanes.

Finally, in co-pending European patent application No. 00119099 there is described 3,3-dimethyl indan-1-one and its use in fragrance applications and described as having safranal-like qualities.

Accordingly, perfumers and flavourists are continually looking for new compounds having safron-like qualities, and there remains a need to identify further compounds useful as flavour or fragrance ingredients and having safranal-like qualities which can be used as safranal substitutes Applicant has now found certain derivatives of 3,3-dimethylindane-1-one and 1,1-dimethylindane having safranal-like qualities.

Therefore the invention provides in one of its aspects the use of compounds of formula (I) as flavour or fragrance ingredients

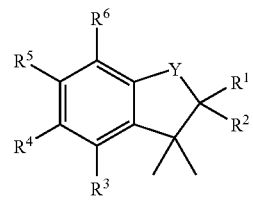

wherein, $R^1$ is H, $C_{1-5}$ alkyl, e.g. methyl, ethyl or propyl; $C_{2-5}$ alkenyl; $CO_2Me$; $CO_2Et$; an acyl group $COR^7$;

$R^2$ is H, $C_{1-4}$ alkyl, e.g. methyl, ethyl or propyl; or $C_{2-4}$ alkenyl; provided that $R^1$ and $R^2$ are not at the same time hydrogen; or $R^1$ and $R^2$ together is an alkylidene radical, e.g. methylene, and E or Z ethylidene, propylidene, iso-propylidene, butylidene, sec-butylidene or iso-butylidene;

$R^3$ is H, $C_{1-4}$ alkyl, e.g. methyl, ethyl or propyl; or $C_{2-4}$ alkenyl;

$R^4$ is H, $C_{1-4}$ alkyl, e.g. methyl, ethyl or propyl; or $C_{2-4}$ alkenyl;

$R^5$ is H, $C_{1-4}$ alkyl, e.g. methyl, ethyl or propyl; or $C_{2-4}$ alkenyl;

$R^6$ is H, $C_{1-4}$ alkyl, e.g. methyl, ethyl or propyl; or $C_{2-4}$ alkenyl;

$R^7$ is H, $C_{1-3}$ alkyl, $C_{2-3}$ alkenyl; $CH_2OR^8$;

$R^8$ is H, $C_{1-3}$ alkyl or $C_{2-3}$ alkenyl;

Y is a group $CH_2$, $C=O$, $CHR^9$, or $C=CR^{10}R^{11}$;

$R^9$ is $C_{1-5}$ alkyl, e.g. methyl, ethyl or propyl; or $C_{2-5}$ alkenyl;

$R^{10}$ is $C_{1-5}$ alkyl, e.g. methyl, ethyl or propyl; or $C_{2-5}$ alkenyl; and $R^{11}$ is H, methyl or ethyl.

The compounds of formula (I) exhibit a a woody, woody-ambery, or saffron note and are particularly useful as flavour or fragrance ingredients for use in fragrance or flavour compositions or perfumed or flavoured articles. In a preferred aspect of the invention there is provided the use of a compound IA, IB, IC,ID, or mixtures thereof as flavour or fragrance ingredients in fragrance or flavour compositions or perfumed or flavoured articles.

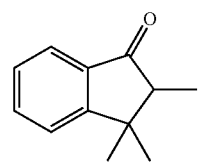

IA

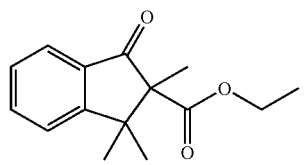

IB

IC

-continued

ID

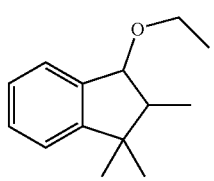

Compound IA displays a strong, very natural saffron note that is comparable to saffron. The strength and character of its odour is totally unexpected having regard to the structurally similar prior art compounds. Still further, the compound displays high substantivity which is likewise completely unexpected. Compound IB exhibits a woody ambery note comparable to the known materials Okoumal (2,4-Dimethyl-2-(5,5,8,8-tetramethyl-5,6,7,8-tetrahydro-naphthalen-2-yl)-[1,3]dioxolane) or Timberol (1-(2,2,6-Trimethyl-cyclohexyl)-hexan-3-ol). Compound IC exhibits a very natural vetyver-type note. Compound ID exhibits a rosy damascone-type odour.

In a preferred embodiment of the present invention, the compounds of formula (I) should have molecular weights not exceeding about 350, more particularly not exceeding 300. The skilled person will appreciate that for molecules to have useful odourant properties the molecular weight thereof must not be so high as to reduce its vapour pressure to a point where it does not release its odour.

The skilled person will appreciate that compounds of formula (I) have chiral centres and therefore may be resolved into their enantiomerically pure forms. However, resolving stereoisomers adds to the complexity and cost of manufacture and purification of compounds and so it is preferred to use said compounds as racemic mixtures.

Many of the compounds of formula (I) are novel. Accordingly, the invention provides in another of its aspects a compound of formula (I)

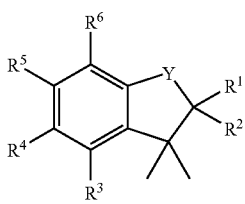

wherein, the residues $R^1$ through $R^{10}$ are as hereinabove defined with the proviso that the indanones 2,3,3-trimethyl indan-1-one (compound 1A hereinabove), 2-isopropyl-3,3-dimethylindane-1-one, 3,3,5,7-tetramethyl indane-1-one, 3,3,5-trimethyl indane-1-one, 2-acetoxy-2,3,3-trimethyl indan-1-one, 2-carboxylic acid methyl ester-3,3-dimethyl-indan-1-one and 3,3-dimethyl-5 isopropyl or tert.butyl indane-1-one; the 1,1-dimethyl-4,5,6 or 7-di($C_{1-5}$ alkyl)indanes, or 1,1,2-trimethyl-4,5,6- or 7-di ($C_{1-5}$ alkyl)indanes; and 2,2,3,3-tetramethyl-1-indanylidene derivatives are excluded.

The compounds may find use in practically all fields of flavour and fragrance applications, for example in fine perfumery, or in perfumed products of all kinds, for example luxury perfumes, cosmetic articles, consumer healthcare products or household products, e.g. washing agents, detergents and soaps, or in flavour applications in food and beverage items, and in tobacco products.

In these applications the compounds of formula (I) may be used alone or in admixture with other fragrances or flavourants. Preferably however, the compounds of the formula (I) are admixed with other fragrance molecules. The use of a compound of formula (I) in this regard is not limited to any particular perfume type nor to any special olfactory direction, odourant or class of substance. Thus, compounds of the formula (I) may be mixed with, for example, ethereal oils and extracts, e.g. castoreum, costus root oil, oak moss absolute, geranium oil, jasmin absolute, patchouli oil, rose oil, sandalwood oil or ylang-ylang oil;

alcohols, e.g. citronellol, Ebanol®, eugenol, geraniol, Super Maguet®, linalool, phenylethyl alcohol, Sandalore®, terpineol or Timberol®;

aldehydes and ketones, e.g. α-amylcinnamaldehyde, Georgywood®, hydroxycitronellal, Iso E Super®, Isoraldeine®, Hedione®, maltol, methyl cedryl ketone, methylionone or vanillin;

ether and acetals, e.g. Ambrox®, geranyl methyl ether, rose oxide or Spirambrene®;

esters and lactones, e.g. benzyl acetate, cedryl acetate, Cyclomusk, γ-decalactone, Helvetolide®, γ-undecalactone or vetivenyl acetate;

macrocycles, e.g. ambrettolide, ethylene brassylate or Exaltolide®; and heterocycles, e.g. isobutylchinoline.

However, due to their unique character, the compounds of formula (I) are especially well suited for use as very potent modifiers in laundry care perfume compositions, personal care perfume compositions as well as fine fragrance perfume compositions as is more specifically illustrated in the Examples.

In addition to their admixture with other fragrances or flavourants, the compounds of formula (I) may be admixed with one or more ingredients or excipients conventionally used in conjunction with fragrances or flavourants in fragrance or flavour compositions, for example carrier materials, and other auxiliary agents commonly used in the art.

The proportions in which the compounds of formula (I) are employed in compositions according to the present invention may vary within a large range of values and will depend upon the nature of the composition or article one intends to perfume or flavour, for example the nature of co-ingredients, and the particular effect that the perfumer or flavourist seeks. In general, the compounds may be employed in amounts of from 0.01 to 50% (wt), more particularly 0.01 to 10% (wt).

Compounds of formula (I) may be prepared from the known compound 3,3-dimethyl indan-1-one. 3,3-dimethyl indan-1-one's synthesis has been described in U.S. Pat. No. 5,329,049.

A convenient synthesis into 3,3-dimethyl indan-1-one is via the acid catalysed cyclisation of phenylisobutyric acid. The phenylisobutyric acid may be prepared by reaction of neophylchloride with magnesium followed by carbon dioxide under known conditions. Typically, one obtains phenylisobutyric acid in admixture with an unwanted coupling product 2,5-dimethyl-2,5-diphenyl hexane.

It is conventional to carry out such reactions in THF as solvent. However, this is a relatively expensive solvent which is also difficult to recover. Accordingly, one would prefer to use a cheaper solvent, for example MTBE. A problem with this approach however, is initiating such a Grignard reaction in MTBE.

These problems may be overcome and one can obtain the desired phenylisobutyric acid in about 90% yield if one suspends magnesium in a solvent consisting essentially of a mixture of THF and MTBE, in particular in a ratio of about 1:3, and adds the neophylchloride slowly, e.g. over a period of about 5 to 6 hours.

In the preparation of compounds of formula (I), 3,3-dimethyl indan-1-one may be alkylated, for example using an alkyl halide at the 2-position according to techniques known in the art to provide a 2-alkyl-3,3-dimethyl indan-1-one as particularised by compound IA above. An additional substituent at the 2-position may be added by further alkylating or acylating according to known synthetic protocols. Further derivatisation, e.g. reduction of the acyl group to an alcohol and the subsequent alkylation of the alcohol may be carried out to produce, for example ethers as particularised by the compound IC above. Indanes may be formed from the corresponding indan-1-one by reduction according to known syntheses to produce the indane or the indane-1-ol. Further derivatisation of the indane-1-ol can be carried out to produce ethers as particularised by the compound ID above according to known syntheses.

Further details relating to the synthesis of compounds of formula (I) are set forth in the examples.

There now follows a series of examples that illustrate the invention.

EXAMPLE 1

Preparation of 3,3,2-Trimethyl-1-indanone IA a) 3,3-Dimethyl-1-indanone

3-Methyl-3-phenyl-butanoic Acid (Method a)

Magnesium (36.9 g, 1.52 mol, 50-150 mesh), neophylchloride (2.0 g, 0.01 mol) and tetrahydrofuran (40 ml) were placed in a flask under an atmosphere of argon. A Grignard reaction was then started with 1,2-dibromoethane (0.2 ml) and tert.-butyl methyl ether (MTBE, 50 ml) was subsequently added while maintaining reflux. Neophylchloride (258 g, 1.53 mol) dissolved in MTBE (400 ml) was then added at 48° C. over a period of 5.5 h. After 1.7 h stirring at the same temperature, the reaction mixture was diluted with MTBE (500 ml). Dried $CO_2$ was then introduced above the surface at a temperature of 35° C. (ice cooling) for 18 min and directly into the solution for 5 min. The mixture was then acidified with HCl 16% and the organic phase was extracted with NaOH 32% (160 ml). The alkaline solution was first washed with MTBE and then again acidified with HCl 16%. Extraction with MTBE and evaporation of the solvent gave 3-Methyl-3-phenyl-butanoic acid (247.2 g).

$^1$H-NMR (CDCl$_3$): 10.50-11.00 (broad, 1H), 7.19-7.37(m, 5H), 2.64 (s, 2H), 1.46 (s, 6H).

3-Methyl-3-phenyl-butanoic Acid (Method b)

Magnesium (4,86 g, 0.2 mol, 50-150 mesh), neophylchloride (0.2 g) and tetrahydrofurane(10 ml) were placed in a flask under an atmosphere of argon. A Grignard reaction was then started with 1,2-dibromoethane (0.2 ml). Neophylchloride (35,47 g, 0.2 mol) dissolved in MTBE (50 ml) was then added at reflux over a period of 50 minutes. After stirring for 2½ h at the same temperature, the reaction mixture was diluted with MTBE and dried $CO_2$ was introduced above the surface at a temperature of 35° C. (ice cooling). The mixture was then acidified with HCl and extracted with MTBE. GC revealed the presence of 2,5-dimethyl-2,5-diphenyl-hexane and phenylisobutyric in a ratio of 54:46.

3,3-Dimethyl-1-indanone

3-Methyl-3-phenyl-butanoic acid (247.2 g, 1.39 mol) was placed in a flask and warmed to 130° C. Sulphuric acid 95% (180 ml) was then added over 4 min and the mixture was stirred at 130° C. for 1 h, after which more sulphuric acid (10 ml) was added. After stirring for 45 min, the dark solution was poured onto ice (500 g) and extracted with hexane (200 ml). The organic phase was washed with NaHCO$_3$ (50 ml), dried (MgSO$_4$) and evaporated. The remaining oil was distilled in vacuo (78°$_{0.065\ Torr}$) to give 3,3-dimethyl-1-indanone (157.5 g).

$^1$H-NMR (CDCl$_3$): 7.45-7.75 (m, 3H), 7.36 (t, 1H), 2.59 (s, 2H), 1.42 (s, 6H).

b) 3,3,2-Trimethyl-1-indanone 1A

KH (32 g at 35% in mineral oil, 280 mmol, 1.4 equiv.) was suspended in THF (160 ml) and 3,3-dimethyl-1-indanone (as prepared as described above, 32 g, 200 mmol) in THF (150 mmol) was added. The green suspension was stirred for 1.5 h at RT, then triethylborane (1M solution in THF, 280 ml, 280 mmol, 1.4 equiv.) was added slowly. After 1 h stirring at RT methyl iodide (40 g, 280 mmol, 1.4 equiv.) was added and the suspension stirred for 48 h at RT. Treatment with H$_2$O (240 ml), 10% aq. NaOH (240 ml) and 30% aq. H$_2$O$_2$-solution (240 ml) under occasional cooling was followed by extraction with MTBE. The organic layer was washed with brine, dried over MgSO$_4$ and concentrated in a rotary evaporator. Bulb-to-bulb distillation (0.05 mbar/100° C.) yielded 24.8 g (71%) of product.

IR (film): 2963, 1712, 1668, 1604, 1223, 956, 764, 721. $^1$H-NMR (400 MHz, CDCl$_3$): 7.72 (dd, J$_1$=1, J$_2$=8, 1H), 7.57 (t, J=8, 1H), 7.50 (d, J=8, 1H), 7.34 (t, J=8, 1H), 2.46 (q, J=8, 1H), 1.44 (s, 3H), 1.21 (d, J=8, 3H), 1.12 (s, 3H). $^{13}$C-NMR (100 MHz, CDCl$_3$): 207.6 (s), 162.5 (s), 134.5 (d), 134.4 (s), 127.2 (d), 123.2 (d), 123.2 (d), 54.5 (d), 41.6 (s), 27.6 (q), 26.7 (q), 9.5 (q). MS (EI): 174(29, M+), 159(100, ) 131(39), 115 (24), 103(7), 91(22), 77(11).

EXAMPLE 2

Preparation of 1,1,2-Trimethyl-3-oxo-indan-2-carboxylic acid ethyl ester 1B 3,3-Dimethylindanone was prepared as described in Example 1.

To the suspension of NaH (3.05 g at 55% in mineral oil, 70 mmol, 1.4 equiv.) in THF (25 ml) was added neat diethyl carbonate (23.6 g, 200 mmol, 4 equiv.) followed by a solution of 3,3-dimethyl-1-indanone (8.0 g, 50 mmol, 1 equiv.) in THF (25 ml). The mixture was heated to 80° C. for 16 h, then cooled to 50° C. and treated with methyl iodide (21.3 g, 150 mmol, 3 equiv.). After 4.5 h further stirring at 50° C. the mixture was cooled to 5° C. and EtOH (20 ml) followed by H$_2$O (20 ml) was introduced. After dilution with MTBE the phases were separated and the organic layer washed twice with brine, then dried over MgSO$_4$. The residue obtained after concentration in a rotary evaporator was subjected to a short path distillation at 0.05 mbar and 90-115° C., followed by a fine distillation at 0.05 mbar, 112-116° C. to yield the product as a colourless oil (6.5 g, 53%).

IR (film): 2977, 1714, 1604, 1460, 2191, 1247, 1019, 959, 765. $^1$H-NMR (400 MHz, CDCl$_3$): 7.76 (d, J=8, 1H), 7.63 (t, J=8, 1H), 7.47 (d, J=8, 1H), 7.39 (t, J=8, 1H), 4.08 (q, J=7, 2H), 1.42 (s, 3H), 1.36 (s, 3H), 1.30 (s, 3H), 1.12 (t, J=7, 3H). $^{13}$C-NMR (100 MHz, CDCl$_3$): 203.7 (s), 171.8 (s), 161.3 (s), 135.0 (d), 134.0 (s), 127.6 (d), 124.0 (d), 123.0 (d), 63.7 (s), 60.8 (t), 45.4 (s), 27.3 (q), 25.8 (q), 16.6 (q), 13.8 (q). MS (EI):

246(8, M⁺), 231(28), 218 (14), 203(16), 185(11), 122(100,) 159(39), 145(55), 129(47), 115(50), 91(26), 77(18).

EXAMPLE 3

Preparation of
2-Ethoxymethyl-1,1,2-trimethyl-indane IC a) Preparation of (1,1,2-Trimethyl-indan-2-yl)-methanol 1,1,2-Trimethyl-3-oxo-indan-2-carboxylic acid ethyl ester (69.60 g, 300 mmol) as prepared in Example 2 was dissolved in $Et_2O$ (150 ml) and added to the suspension of $LiAlH_4$ (11.40 g, 300 mmol, 1 equiv.) in $Et_2O$ (150 ml) at such a rate as to maintain a gentle reflux. The mixture was further heated to reflux temperature for 16 h, then cooled to 5° C. At this temperature were added successively $H_2O$ (11.4 ml), 15% aq. NaOH (11.4 ml) and $H_2O$ (34.2 ml). The precipitate formed was removed by filtration and the filtrate concentrated and dried to yield the product as a white solid (44.23 g, 72%). A part of this material (10.3 g, 50 mmol) was dissolved in EtOH (100 ml). Conc. aq. HCl (1 ml) and Pd/C (1.0 g) were added and hydrogenation performed during 4.5 h under 1 atm $H_2$. The product obtained after filtration over Celite and concentration in a rotary evaporator was dissolved in MTBE and washed neutral with brine. Drying over $MgSO_4$ and concentration in a rotary evaporator yielded a crude which was distilled at 0.05 mbar/95-101° C, to yield 6.26 g (69%) of product which crystallised upon standing as a white solid, m.p.=48-50° C.

IR (film): 3500-3200 br, 2956, 2874, 1475, 1453, 1032, 829, 758. $^1H$-NMR (400 MHz, $CDCl_3$): 7.15-7.07 (m, 4H), 3.55, 3.42 (AB, J=11, 2H), 2.91, 2.58 (AB, J=16, 2H), 2.01 (OH), 1.14 (s, 3H), 1.11 (s, 3H), 1.03 (t, J=7, 3H). $^{13}C$-NMR (100 MHz, $CDCl_3$): 152.4 (s), 140.4 (s), 126.4 (d), 126.2 (d), 124.6 (d), 121.9 (d), 67.9 (t), 49.6 (s), 47.2 (s), 40.3 (t), 25.0 (q), 22.8 (q), 18.5 (q). MS (EI): 190(39, M⁺), 175(53), 157 (98), 145(100), 129(58), 159(39), 129(58), 117(61), 105(14), 91(55), 77(15).

b) 2-Ethoxymethyl-1,1,2-trimethyl-indane

The alcohol prepared in a) (3.03 g, 16 mmol) was added to the suspension of NaH (1.40 g at 55% w/w in mineral oil, 32 mmol, 2 equiv.) in THF (20 ml). Diethylsulfate (4.90 g, 32 mmol, 2 equiv.) was added and the mixture stirred at RT during 50 h. $H_2O$ (20 ml) was added, the phases separated and the organic layer concentrated. The residue was suspended in 2N aq. NaOH (100 ml) and the mixture heated to reflux for 1 h, then extracted with MTBE. The organic layer was washed with brine, dried over $MgSO_4$ and concentrated. Distillation of the crude at 0.05 mbar/60-68° C. yielded the product as a colourless oil (2.76 g, 79%).

IR (film): 3020, 2867, 1478, 1454, 1104, 758, 726. $^1H$-NMR (400 MHz, $CDCl_3$): 7.15-7.07 (m, 4H), 3.42 (q, J=7, 2H), 3.36, 3.20 (AB, J=9, 2H), 2.95, 2.54 (AB, J=16, 2H), 1.17 (s, 3H), 1.16 (t, J=7, 3H), 1.10 (s, 3H), 1.03 (t, J=7, 3H). $^{13}C$-NMR (100 MHz, $CDCl_3$): 152.6 (s), 140.7 (s), 126.2 (d), 126.0 (d), 124.6 (d), 121.9 (d), 75.6 (t), 66.6 (t), 48.9 (s), 47.5 (s), 40.9 (t), 24.4 (q), 23.3 (q), 19.5 (q), 15.1 (q). MS (EI): 218(7, M⁺), 172(21), 159(44), 157(100), 143(26), 129(32), 115(44), 1 91(19), 77(6).

EXAMPLE 4

Preparation of 3-Ethoxy-1,1,2-trimethylindane 1D a) 2,3,3-Trimethylindane-1-ol 3,3,2-Trimethyl-1-indanone (9.03 g, 50 mmol) as prepared above was dissolved in THF (40 ml) and added to the suspension of $LiAlH_4$ (3.80 g, 100 mmol, 2 equiv.) in THF (10 ml). The mixture was heated to reflux for 2 h, then cooled to 5° C. and hydrolysed via addition of 2N aq. HCl-solution. The crude product obtained after extraction with MTBE, washing with sat. aq. $NaHCO_3$ solution and brine, drying over $MgSO_4$ and concentrating in a rotary evaporator was distilled at 0.1 mbar/72-73° C. to yield 8.70 g (95%) of product as a colourless viscous oil. The compound was obtained as a mixture of diastereomers 87:13, the major isomer being the 1,2-trans compound upon NMR-analysis.

IR (film): 3307 br., 2957, 2868, 1454, 1043, 760, 749, 642. $^1H$-NMR (1,2-trans isomer, 400 MHz, $CDCl_3$): 7.33-7.16 (m, 4H), 4.65 (d, J=9, 1H), 2.52 (br. s, OH), 1.79 (m, 1H), 1.27 (s, 3H), 1.14 (d, J=6, 3H), 0.94 (s, 3H). $^{13}C$-NMR (1,2-trans isomer, 100 MHz, $CDCl_3$): 151.3 (s), 143.3 (s), 127.9 (d), 126.7 (d), 123.3 (d), 122.0 (d), 80.2 (d), 55.5 (d), 43.2 (s), 26.7 (q), 24.5 (q), 11.0 (q). MS (EI): 176(27, M⁺), 161(100,), 143(84), 128(51), 115(30), 105(15), 91(26), 77(18).

b) 3-Ethoxy-1,1,2-trimethylindane

The protocol described for 2-Ethoxymethyl-1,1,2-trimethylindan (Example 3) was repeated with 2,3,3-Trimethylindan-1-ol (1.76 g, 10 mmol), NaH (870 mg at 55%, 20 mmol, 2 equiv.) and diethyl sulphate (3.08 g, 20 mmol, 2 equiv.). The crude product obtained was purified by column chromatography on $SiO_2$ (hexane/MTBE 19:1) followed by a bulb-to-bulb distillation at 0.15 mbar/80° C. to obtain the product as a colourless liquid in 45% yield. Only the major 1,2-trans isomer was isolated and characterised.

IR (film) 3025, 2868, 1476, 1455, 1103, 1083, 760, 745. $^1H$-NMR (400 MHz, $CDCl_3$): 7.33 (dd, $J_1$=, $J_2$=8, 1H), 7.23-7.16 (m, 3H), 4.52 (d, J=8, 1H), 3.83-3.74 (sym. m, 2H), 2.04 (quint, J=7, 1H), 1.29 (s, 3H), 1.29 (t, J=7, 3H), 1.15 (d, J=7, 3H), 0.98 (s, 3H). $^{13}C$-NMR (100 MHz, $CDCl_3$): 151.5 (s), 142.0 (s), 127.8 (d), 126.4 (d), 123.7 (d), 122.1 (d), 87.7 (d), 65.5 t), 51.7 (d), 43.3 (s), 27.2 (q), 24.5 (q), 15.9 (q), 12.2 (q). MS (EI): 204(9, M⁺), 189(4), 175(7), 159(38), 143(100), 128(40), 117(34), 105(12), 91(25), 77(12).

EXAMPLE 5

Synthesis of 2-substituted Alkylidene Compounds
2-Ethylidene-3,3-dimethyl-indan-1-one a) 2-Methoxymethylene-3,3-dimethyl-indan-1-one Ethylformate (8.10 g, 110 mmol) in THF (50 ml) was added to the suspension of NaH (55% in mineral oil, 4.80 g, 110 mmol) in THF (50 ml). After stirring for 5 min at RT Dimethylindanone (16.0 g, 100 mmol)in THF (50 ml) was added. Gas evolution started and the temperature of the mixture rose and was controlled with an icebath to not exceed 40° C. After further stirring for 4.5 h at RT, methyl iodide (42.6 g, 300 mmol) was added und stirring continued for 48 h. After quenching with aq. $NaHCO_3$-solution and aqueous workup a dark red oil (20.4 g, 100%) of was obtained.

b) E-and Z-2-Ethylidene-3,3-dimethyl-indan-1-one

The product from a) (5.05 g, 25 mmol) was dissolved in diethylether (25 ml) and the solution was cooled to −70° C. MeLi (1.6 N in diethylether, 15.6 ml, 25 mmol) was added dropwise via syringe over 25 min. The mixture was stirred for further 3.5 h at −70° C., then 6 n aq. HCl-solution (20 ml) was introduced. Standard workup yielded a crude (4.46 g, 96%) from which two diastereomers were separated by FC on $SiO_2$ (hexane/methyl t-butyl ether 9:1) to elute first the (Z)-isomer (720 mg, 15%) followed by the (E)-isomer (1.34 g, 29%).

Z-isomer:

IR (film): 2961, 1694, 1641, 1604, 1349, 1226, 931. $^1H$-NMR (400 MHz, $CDCl_3$): 7.76 (d, J=8, 1H), 7.58 (t, J=8, 1H), 7.44 (d, J=7, 1H), 7.35 (d, J=8, 1H), 6.31 (q, J=8, 1H), 2.36 (d, J=8, 3H), 1.41 (s, 6H). $^{13}C$-NMR (100 MHz, $CDCl_3$):

194.8 (s), 158.4 (s), 145.8 (s), 137.0 (s), 135.6 (d), 134.5 (d), 127.3 (d), 123.5 (d), 123.4 (d), 41.8 (s), 29.5 (q), 14.2 (q). MS (EI): 186(63, M$^+$), 171(100), 143(39), 128(76), 115(40).

E-isomer:
   IR (film): 2964, 1703, 1647, 1605, 1325, 1260, 1214, 862. $^1$H-NMR (400 MHz, CDCl$_3$): 7.81 (d, J=8, 1H), 7.61 (t, J=8, 1H), 7.50 (d, J=7, 1H), 7.37 (d, J=8, 1H), 6.91 (q, J=8, 1H), 2.05 (d, J=8, 3H), 1.54 (s, 6H). $^{13}$C-NMR (100 MHz, CDCl$_3$): 192.9 (s), 160.5 (s), 145.7 (s), 135.5 (s), 134.8 (d), 132.8 (d), 127.4 (d), 123.8 (d), 123.0 (d), 41.4 (s), 27.2 (q), 14.1 (q). MS (EI): 186(33, M$^+$), 171(100), 143(23), 128(60), 115(29).

3,3-Dimethyl-2-methylene-indan-1-one

Diethylamine (8.76 g, 0.12 mol) was cooled to 0° C. and 62.5% aq. H$_2$SO$_4$ was added slowly. Aqueous formaldehyde solution (36.5%, 9.86 g, 0.12 mol) was added, followed by dimethylindanone (16.0 g, 0.10 mol). The mixture was heated to 110° C. for 5.5 h. Aqueous workup yielded a ca. 1:1 mixture of starting material and product which was separated by FC on SiO$_2$ to yield the product as a colourless oil (2.73 g, 13%).

IR (film): 2964, 1706, 1643, 1605, 1326, 1301, 1226, 983. $^1$H-NMR (400 MHz, CDCl$_3$): 7.82 (d, J=8, 1H), 7.63 (t, J=8, 1H), 7.51 (d, J=7, 1H), 7.40 (d, J=8, 1H), 6.30 (s, 1H), 5.56 (s, 1H), 1.48 (s, 6H). $^{13}$C-NMR (100 MHz, CDCl$_3$): 193.5 (s), 159.6 (s), 154.7 (s), 135.7 (s), 135.4 (d), 127.7 (d), 124.2 (d), 123.6 (d), 117.0 (t), 41.5 (s), 29.3 (q). MS (EI): 172(41, M$^+$), 157(100), 129(40), 128(48), 115(10).

EXAMPLE 6

Preparation of a Perfume for Shampoo or Shower Gel

| Ingredients | Weight parts |
| --- | --- |
| Benzyl Acetate | 15.00 |
| Geranyl Acetate synthetic | 30.00 |
| cis-3-Hexenyl Acetate | 3.00 |
| Hexyl Acetate | 35.00 |
| Agrumex ® | 120.00 |
| α-Amyl Cinnamic Aldehyde | 80.00 |
| α-Amyl Cinnamic Aldehyde | 50.00 |
| Hexanal | 1.00 |
| Cinnamic Aldehyde 10% in DPG | 15.00 |
| Benjoin Larmes Siam 50% in DIP | 30.00 |
| Dimethyl benzyl butyrate | 15.00 |
| Cyclal C ® | 3.00 |
| Cyclohexal | 50.00 |
| Damascenone at 1% in DPG | 25.00 |
| α-Damascone at 10% in DPG | 8.00 |
| Dipropylene glycol (DPG) | 99.00 |
| Eugenol | 1.00 |
| Fructone ® | 120.00 |
| Fruit Sec. Subst. at 10% in DPG | 4.00 |
| Galaxolide ® at 50% in BB | 50.00 |
| Galaxolide ® at 50% in PHT | 100.00 |
| 2-trans hexenal at 10% in DPG | 1.00 |
| 3-cis-Hexenol | 1.00 |
| 3-cis-Hexenol Isobutyrate | 1.00 |
| Hexyl Isobutyrate | 15.00 |
| Phenoxy Ethyl Isobutyrate | 50.00 |
| Ethyl 2-Methyl Butyrate | 2.00 |
| Isopropyl 2-Butyrate | 4.00 |
| Allyl Oenanthate | 15.00 |
| Peach Pure ® | 20.00 |
| Verdyle Propionate | 20.00 |
| Prunella Subst. ® | 7.00 |
| Prunolide ® | 7.00 |
| Total | 997 |

Addition of 3 weight parts of compound Ia at 1% in DPG changes the note of this perfume from green apple to a sweeter and softer "Golden Delicious" type. It enhances also the fruit skin aspect of this perfume.

EXAMPLE 7

Preparation of a Guava Perfume for Fabric Softener

| Ingredients | Weight parts |
| --- | --- |
| Ethyl Acetate | 40.00 |
| cis-3-Hexenyl Acetate | 6.00 |
| Phenyl Propyl Acetate | 8.00 |
| Benzyl alcohol | 100.00 |
| Phenyl Ethanol | 4.00 |
| Phenyl Propanol | 8.00 |
| Benzaldehyde | 4.00 |
| Ethyl Benzoate | 12.00 |
| Methyl Benzoate | 28.00 |
| Bisabolene | 10.00 |
| Ethyl Butyrate | 8.00 |
| Methyl Cinnamate | 40.00 |
| γ-Decalactone | 4.00 |
| Dipropylene Glycol (DPG) | 444.00 |
| Gardenol ® | 40.00 |
| 2-trans-Hexenal | 8.00 |
| cis-3-Hexenol | 20.00 |
| Homofuronol ® at 20% in DPG | 80.00 |
| β-Ionone | 4.00 |
| Ocimene | 8.00 |
| p-Cymene | 4.00 |
| Thiogeraniol at 1% in TEC | 100.00 |
| Total | 980.00 |

Addition of 20 weight parts of compound Ia enhances the exotic aspect of this perfume and its overall impact.

EXAMPLE 8

Preparation of a Woody Accord for a Masculine Perfume

| Ingredients | Weight parts |
| --- | --- |
| Ambrettolide ® | 80.00 |
| Ambrofix ® | 10.00 |
| Dipropylene Glycol (DPG) | 199.00 |
| Georgywood ®[1] | 100.00 |
| Javanol ®[2] | 5.00 |
| Okoumal ® | 5.00 |
| Velvione ®[3] | 100.00 |
| Total | 499.00 |

[1] 1-(1,2,8,8-Tetramethyl-1,2,3,4,5,6,7,8-octahydro-naphthalen-2-yl)-ethanone
[2] [1-Methyl-2-(1,2,2-trimethyl-bicyclo[3.1.0]hex-3-ylmethyl)-cyclopropyl]-methanol
[3] 2,2,5,6-Tetramethylcyclohex-5-en-1-yl-but-1-en-3-on Addition of 1 weight part of compound Ia adds exceptional relief and warmth to this woody accord.

Ebanol®, Super Maguet®, Sandalore®, Timberol®, Georgywood®, Iso E Super®, Isoraldeine®, Hedione®, Ambrox®, Spirambrene®, Helvetolide®, Exaltolide®, Agrumex®, Cyclal C®, Fructone®, Galaxolide®, Peach Pure®, Prunella Subst ®, Prunolide®, Gardenol®, Homofuronol®, Ambrettolide®, Ambrofix®, Javanol®, Okoumal®, and Velvione® indentify fragrance compositions or fragrance constituents whose specific identity are proprietary to their respective supplier, but which are otherwise well known to the art.

The invention claimed is:

1. A method of adding flavor or fragrance to a composition or article which comprises adding a compound selected from IA, IB, IC, ID

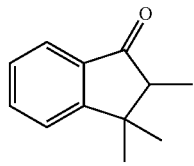
IA

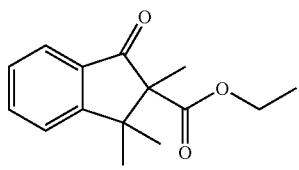
IB

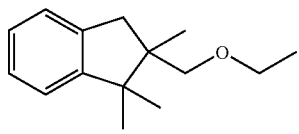
IC

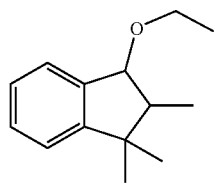
ID

2. A method according to claim 1 of adding flavor or fragrance to a composition or article comprising adding a compound according to formula IA

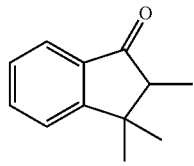
IA as a flavor or fragrance ingredient.

3. The method according to claim 1 of adding flavor or fragrance to a composition or article comprising adding a compound according to formula IB

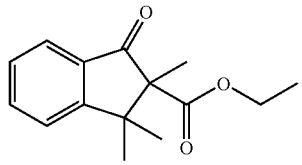
IB as a flavor or fragrance ingredient.

4. A method according to claim 1 of adding flavor or fragrance to a composition or article comprising adding a compound according to formula IC

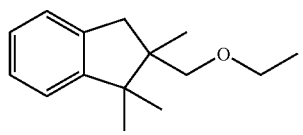
IC as a flavor or fragrance ingredient.

5. A method according to claim 1 of adding flavor or fragrance to a composition, or article comprising adding a compound according to formula ID

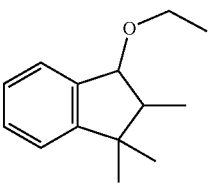
ID as a flavor or fragrance ingredient.

* * * * *